US008582634B2

(12) United States Patent
Li et al.

(10) Patent No.: US 8,582,634 B2
(45) Date of Patent: Nov. 12, 2013

(54) OFDM SIGNAL DEMODULATION METHOD AND DEVICE THEREOF

(75) Inventors: Qiang Li, Shenzhen (CN); Ning Qiu, Shenzhen (CN); Nanshan Cao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 55 days.

(21) Appl. No.: 13/259,038

(22) PCT Filed: Apr. 23, 2010

(86) PCT No.: PCT/CN2010/072170
§ 371 (c)(1),
(2), (4) Date: Dec. 5, 2011

(87) PCT Pub. No.: WO2010/142168
PCT Pub. Date: Dec. 16, 2010

(65) Prior Publication Data
US 2012/0114031 A1     May 10, 2012

(30) Foreign Application Priority Data
Jun. 9, 2009     (CN) .......................... 2009 1 0108008

(51) Int. Cl.
*H04L 27/06*     (2006.01)
*H04L 27/01*     (2006.01)

(52) U.S. Cl.
USPC .......................................... 375/229; 375/340

(58) Field of Classification Search
None
See application file for complete search history.

(56) References Cited

U.S. PATENT DOCUMENTS 6,999,406 B2 *   2/2006    Takahashi et al. ............ 370/208
7,609,773 B2 *  10/2009    Bhushan et al. ............. 375/260
(Continued)

FOREIGN PATENT DOCUMENTS

| CN | 1949754 A | 4/2007 |
|---|---|---|
| CN | 1988525 A | 6/2007 |
| CN | 101406017 A | 4/2009 |

OTHER PUBLICATIONS

Jan-Jaap van de Beek, Per Ola Borjesson, Marie-Laure Boucheret, Daniel Landstrom, Julia Martinez Arenas, Per Odling, Christer Ostberg, Mattias Wahlqvist, and Sarah Kate Wilson, "A Time and Frequency Synchronization Scheme for Multiuser OFDM", IEEE Journal on Selected Areas in Communications, vol. 17, No. 11, Nov. 1999.*

(Continued)

*Primary Examiner* — David C. Payne
*Assistant Examiner* — Bahman Badipour
(74) *Attorney, Agent, or Firm* — Oppedahl Patent Law Firm LLC

(57) ABSTRACT

The present invention discloses an OFDM signal demodulation method and device thereof. The method comprises: adding a pre-obtained timing offset estimation value of an OFDM signal demodulation device to the initial position of an OFDM symbol of a received signal to obtain a window deviation value of the OFDM symbol; adding a channel time delay extension to the window deviation value to obtain a combined prefix initial position; calculating the combined OFDM signal value starting from the prefix initial position; processing the Fast Fourier Transform (FFT) for the combined OFDM signal value to obtain a frequency domain data subcarrier signal; calculating the frequency domain original channel estimation value processing the channel estimation based on the original channel estimation value phase modification of the OFDM symbol according to the channel estimation compensation indication value; and processing equalization and detection for the frequency domain data subcarrier signal according to the channel estimation result. The present invention uses the cycle prefix of the received signals to promote the demodulation performance of the OFDM signal demodulation device.

12 Claims, 3 Drawing Sheets

(56) References Cited

U.S. PATENT DOCUMENTS

| | | | |
|---|---|---|---|
| 7,649,963 B2 | 1/2010 | Choi et al. | |
| 7,873,111 B2* | 1/2011 | Spock et al. | 375/260 |
| 8,031,587 B1* | 10/2011 | Kang | 370/210 |
| 8,165,106 B2* | 4/2012 | Yang et al. | 370/350 |
| 8,391,423 B2* | 3/2013 | Kim | 375/340 |
| 2003/0053550 A1* | 3/2003 | Peyla et al. | 375/267 |
| 2004/0248527 A1* | 12/2004 | Park et al. | 455/118 |
| 2006/0215539 A1* | 9/2006 | Vrcelj et al. | 370/208 |
| 2007/0133392 A1* | 6/2007 | Shin et al. | 370/210 |
| 2007/0211809 A1* | 9/2007 | Kim | 375/260 |
| 2007/0230591 A1 | 10/2007 | Choi et al. | |
| 2008/0232496 A1* | 9/2008 | Lin et al. | 375/260 |
| 2009/0034503 A1* | 2/2009 | Kim | 370/343 |
| 2009/0268787 A1* | 10/2009 | Cairns et al. | 375/148 |
| 2010/0074317 A1* | 3/2010 | Sun et al. | 375/232 |
| 2010/0128822 A1* | 5/2010 | Ouchi et al. | 375/343 |
| 2010/0158170 A1* | 6/2010 | Li et al. | 375/346 |
| 2010/0208847 A1* | 8/2010 | Reial et al. | 375/340 |
| 2010/0246564 A1* | 9/2010 | Vrcelj et al. | 370/350 |
| 2011/0002403 A1* | 1/2011 | Wilhelmsson et al. | 375/260 |
| 2011/0013687 A1* | 1/2011 | Li | 375/232 |
| 2011/0019749 A1* | 1/2011 | Wilhelmsson et al. | 375/259 |
| 2011/0069694 A1* | 3/2011 | Skyman et al. | 370/343 |
| 2011/0182374 A1* | 7/2011 | Primo et al. | 375/260 |

OTHER PUBLICATIONS

International Search Report in international application No. PCT/CN2010/072170, mailed on Jul. 29, 2010.

English Translation of the Written Opinion of the International Search Authority in international application No. PCT/CN2010/072170, mailed on Jul. 29, 2010.

* cited by examiner

OFDM SIGNAL DEMODULATION METHOD AND DEVICE THEREOF

TECHNICAL FIELD OF THE INVENTION

The invention relates to the field of communications, particularly to an OFDM (Orthogonal Frequency Division Multiplexing) signal demodulation method and a device thereof.

BACKGROUND

In order to provide uniform high-speed multimedia transmission service, a BWA (Broadband Wireless Access) system firstly needs to adopt a well-performed technology counteracting frequency selective fading. As OFDM technology can effectively alleviate the ill influence caused by frequency selective fading, therefore attracts researchers' attention and has been regarded as a first-choice key physical transmission technology of various new wireless standards a long time ago, and research on its standardization and industrialization has been started.

A MMB (Mobile Multimedia Broadcasting) is an important aspect of an application of OFDM technology. Relative to networking mode of a cellular mobile communication system, a MMBS (Mobile Multimedia Broadcasting System) often adopts a mode of single frequency networking. The working environment where a single frequency network terminal receiver is situated is very special and may be roughly classified into two categories. One is a typical multipath fading environment with short time delay and the other is dual strong path wireless environment with large time delay. In order to effectively counteract the unfavorable influence of a multipath environment with large time delay on an OFDM system of MMB, typically a longer cycle prefix is required to be added into a physical layer frame structure of a broadcasting signal. Cycle prefix is a repetition of an effective signal and is used for guaranteeing orthogonality among subcarriers of received OFDM signals. Usually a receiver will discard a prefix cycle, therefore resulting in power waste of sent signals.

SUMMARY

The technical problem the present invention is to solve is that the useful information cycle prefix in a received signal is discarded without using to enhance the demodulation performance of an OFDM receiver. The present invention provides an OFDM signal demodulation method and a device thereof for solving this problem.

In order to solve the foregoing technical problem, the technical scheme of the present invention is realized in the following way:

an OFDM signal demodulation method, comprising the following steps:

adding a pre-obtained timing offset estimation value of an OFDM signal demodulation device to an initial position of an OFDM symbol of a received signal to obtain a window deviation value of the OFDM symbol;

adding a channel time delay extension to the window deviation value to obtain a combined prefix initial position, calculating a combined OFDM signal value starting from the prefix initial position, and processing Fast Fourier Transform (FFT) for the combined OFDM signal value to obtain a frequency domain data subcarrier signal;

calculating a frequency domain original channel estimation value, processing channel estimation based on an original channel estimation value phase modification of the OFDM symbol according to a channel estimation compensation indication value, and processing equalization and detection for the frequency domain data subcarrier signal according to the channel estimation result.

The method further comprises:

comparing the initial position of an OFDM symbol with an addition result of the timing offset estimation value, and outputting an offset of the integer sampling point as the channel estimation compensation indication value if timing offset of an integer sampling point occurs.

The method further comprises:

Calculating a frequency domain channel response of an OFDM synchronous symbol, and processing FFT for the frequency domain channel response to obtain a channel response on transform domain; dividing the channel response on transform domain into at least two segments and estimating the power of signals in each segment, and then calculating the ratio between the signal power in each segment and a total power; comparing the ratios with a preset detection threshold in turn, and regarding the segment corresponding to the ratio as the channel time delay extension when a ratio is greater than the detection threshold.

The method further comprises:

obtaining, through calculation, the timing offset estimation value of the OFDM signal demodulation device according to phase change relations among different subcarriers of OFDM signal received by the OFDM signal demodulation device.

a corrected value of the phase modification is $\exp\{j2\pi k t_0/N\}$, wherein k represents the reference number of a subcarrier of an OFDM symbol, $t_0$ represents channel estimation compensation indication value, and N represents the number of a subcarriers of the OFDM symbol.

An OFDM signal demodulation device, comprising an FFT window control module, a prefix combination module, an FFT calculation module, a channel estimation module and an equalization detection module, wherein, the FFT window control module is used for adding a timing offset estimation value of an OFDM signal demodulation device to an initial position of an OFDM symbol to obtain a window deviation value of the OFDM symbol;

the prefix combination module is used for adding a channel time delay extension to the window deviation value to obtain a combined prefix initial position, and calculating a combined OFDM signal value starting from the prefix initial position the FFT calculation module is used for processing FFT for the combined OFDM signal value to obtain a frequency domain data subcarrier signal;

the channel estimation module is used for calculating a frequency domain original channel estimation value, and processing channel estimation based on an original channel estimation value phase modification of the OFDM symbol according to a channel estimation compensation indication value;

the equalization detection module is used for processing equalization and detection for the frequency domain data subcarrier signal according to the channel estimation result.

The FFT window control module is further used for comparing the initial position of an OFDM symbol with an addition result of the timing offset estimation value, and outputting an offset of the integer sampling point as the channel estimation compensation indication value when timing offset of an integer sampling point occurs.

The device further comprises a channel identification module, which is used for calculating a frequency domain channel response of an OFDM synchronous symbol, and processing FFT for the frequency domain channel response to obtain a channel response on transform domain; dividing the channel response on transform domain into at least two segments and estimating the power of the signals in each segment, and then calculating the ratio between the signal power in each segment and a total power; comparing the ratios with a preset detection threshold in turn, and regarding the segment corresponding to the ratio as the channel time delay extension when a ratio is greater than the detection threshold.

The device further comprises a timing synchronization module, which is used for searching the initial position of time slot of an OFDM signal so that the FFT window control module may determine the initial position of current OFDM symbol.

The device further comprises a timing offset estimation module, which is used for calculating the timing offset estimation value of an OFDM signal demodulation device.

Compared with the prior art, the OFDM signal demodulation method and the device thereof provided by the present invention estimates and adjusts timing offset in real time, so as to realize sampling offset correction in low complexity, and may make full use of the useful information in OFDM frames to maximally improve the performance of the OFDM signal demodulation device.

DETAILED DESCRIPTION

The OFDM signal demodulation method and the device thereof of the present invention will be described with reference to the accompanying drawings.

Figure 1:
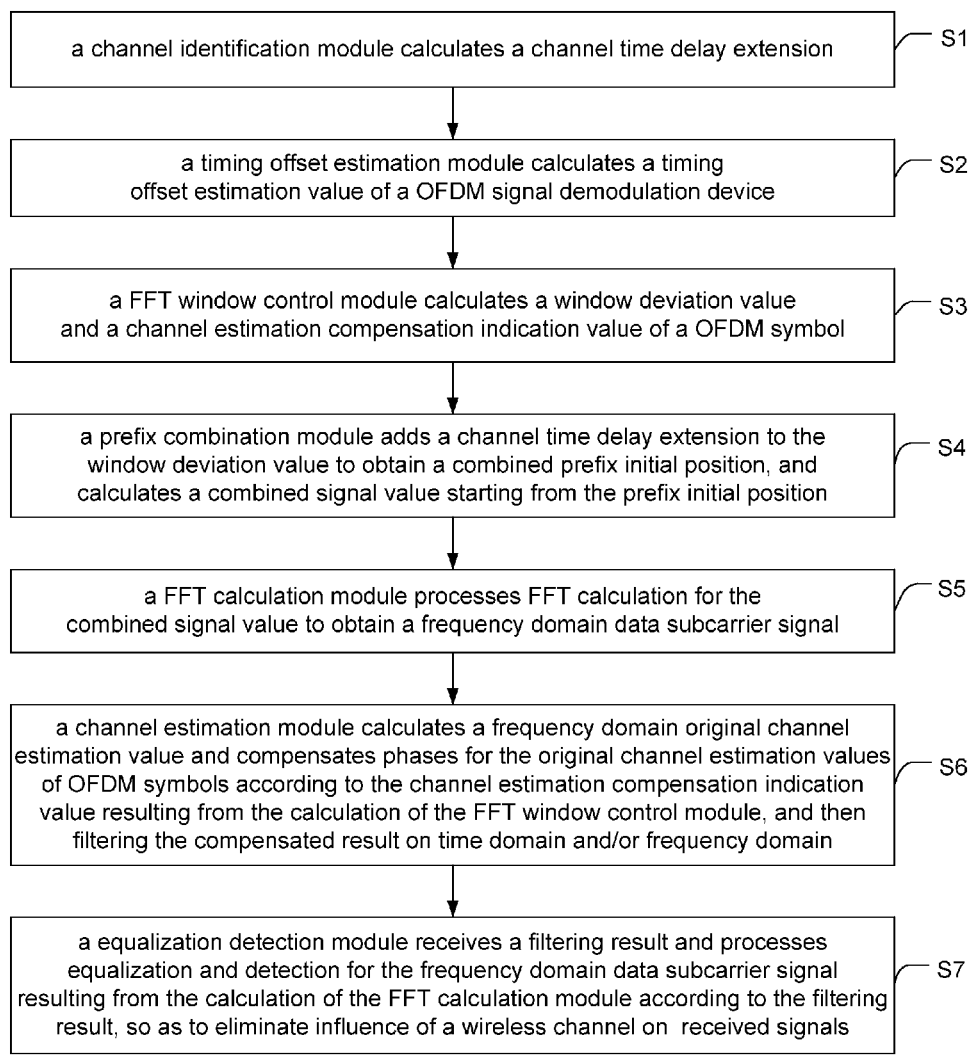
FIG. 1 is a schematic of the process of an OFDM signal demodulation method provided by the present invention.

Please refer to FIG. 1, which is a schematic of the process an OFDM signal demodulation method provided by the present invention.

The OFDM signal demodulation method of the present invention comprises the following steps:

step S1: a channel identification module calculates a channel time delay extension;

the step S1 above specifically comprises the following steps:

calculating frequency domain channel response firstly;

assuming that the time domain synchronous symbol received by the OFDM signal demodulation device is Sync $(0:N_s-1)$, wherein, $N_s$ represents the length of the synchronous symbol. A channel identification module processes FFT on Sync$(0:N_s-1)$ to transform to frequency domain to obtain a frequency domain synchronous symbol FreqSync$(0:N_s-1)$, and then obtains a frequency domain channel response of the synchronous symbol SyncCIR$(0:N_s-1)$ through calculation a frequency domain synchronous symbol FreqSync$(0:N_s-1)$. Randomly selects data at point M in $N_s$ to set as Scir=SyncCIR$(a:a+M-1)$ Secondly, calculating channel response in transform domain;

processing FFT for Scir=SyncCIR$(a:a+M-1)$ at point M to obtain its spectrum data, i.e. channel response Fcir=FFT(Scir) in transform domain.

Then, conducting classified estimation of time delay extension;

the channel response in transform domain is divided into several segments, and the power of signal in each segment is estimated respectively. The proportional relationship between the signal power in each segment and a total power is calculated, and the time delay extension of channel is detected and estimated according to a preset detection threshold.

For example, frequency domain channel response Sync-CIR(0:2047) is calculated, wherein $N_s$=2048. The data Scir=SyncCIR(1:512) at point M=512 is selected and Fcir=FFT(Scir) is calculated. Then power statistics is conducted by four segments and four power P0, P1, P2 and P3 are obtained through calculation, which is as shown below:

$P0=\text{power}\{F\text{cir}(0:7),F\text{cir}(384:511)\}=20$, $P1=\text{power}\{F\text{cir}(0:7),F\text{cir}(496:511)\}=16$, $P2=\text{power}\{F\text{cir}(0:7),F\text{cir}(480:511)\}=17$, $P3=\text{power}\{F\text{cir}(0:7),F\text{cir}(448:511)\}=18$.

Then the ratios between power are calculated from P0, P1, P2 and P3: r1=P1/P0=0.8, r2=P2/P0=0.85, r3=P3/P0=0.9. Further, assuming that the detection threshold th1=th2=th3=0.75 and four segments $D_1$=64, $D_2$=128, $D_3$=256, $D_4$=512. The following judgment method is adopted:

if r1>th1, then the channel time delay extension is $D_1$; otherwise, as described below:

if r2>th2, then the channel time delay extension is $D_2$, otherwise, as described below:

if r3>th3, then the channel time delay extension is $D_3$, otherwise, the channel time delay extension is $D_4$.

From the foregoing judgment, the obtained channel time delay extension is $D_c=D_1=64$.

Step S2: A timing offset estimation module calculates a timing offset estimation value of the OFDM signal demodulation device;

the timing offset estimation module analyzes a timing offset degree of the OFDM signal demodulation device through analyzing phase change relations among different subcarriers of an OFDM signal. As an OFDM signal subcarrier phase shift resulting from the offset of a sampling clock of the OFDM signal demodulation device changes linearly with the change of subcarrier reference number, therefore a plurality of subcarriers and a plurality of OFDM symbols may be used for estimating the offset of the sampling clock. Further, the OFDM signal subcarrier phase shift resulting from a timing error output by a timing synchronization module of the OFDM signal demodulation device is a fixed value which does not change with the change of subcarriers, therefore a plurality of subcarriers and a plurality of OFDM symbols may be used for obtaining a timing offset estimation value. Assuming that the estimated offset of the sampling clock is 10 ppm and the timing offset estimation value is 0.

Step S3: a FFT window control module calculates a window deviation value and a channel estimation compensation indication value of the OFDM symbol;

The step S3 above specifically comprises the following steps:

firstly, calculating the position deviation of a symbol;

searching the initial position of a time slot in an OFDM signal according to the is timing synchronization module, determining that the initial position of current OFDM symbol is $d_t$, obtaining timing offset value $d_{offset}$ combined with the timing offset estimation value resulting from calculation of timing offset estimation module, and calculating the window deviation value of current OFDM symbol $d_d=d_t+d_{offset}$. and secondly, calculating a channel estimation compensation indication value;

considering that normally, the OFDM signal demodulation device needs to process filtering on time domain for the channel estimation values obtained on different OFDM symbols, in order to avoid the undesirable impact of FFT calculation window adjustment on channel estimation, phase compensation must be performed for the original channel estimation value during filtering on time domain, and the channel estimation compensation indication value $t_0 = d_{offset}$.

Assuming that under ideal timing synchronization condition, the initial position of the current OFDM symbol $d_t = 100000$. As the offset of the sampling clock is 10 ppm and the timing offset estimation value is 0, it may be obtained that $d_{offset} = 10$ ppm$\times 100000 + 0 = 1$, then the position deviation of the current OFDM symbol $d_d = 100001$. The channel estimation compensation indication value $t_0 = d_{offset} = 1$.

Step S4: A prefix combination module adds a channel time delay extension to the window deviation value to obtain a combined prefix initial position and calculates the combined signal value starting from the prefix initial position;

The step S4 above specifically comprises the following steps:

firstly, calculating the combined prefix initial position;

calculating the combined prefix initial position $d = d_d + d_c$ according to a wireless channel time delay extension estimation $d_c$ provided by the channel identification module and the window deviation value $d_d$ provided by the FFT window control module. And secondly, calculating the combined signal value;

assuming that the length of FFT is N, the length of cycle prefix is $N_{cp}$, a current FFT input signal after combination is $z(n)$, and the input signal before combination is $x(n)$, then signal $z(n)$ may be obtained through calculation by the following method:

$z(n) = x(d_d + n), n = 0, 1, \ldots, N - N_{cp} + d_c - 1;$ $z(n) = [x(d_d + n) + x(d_d + n - N)]/2, n = N - N_{cp} + d_c, \ldots, N - 1;$ In addition, assuming that wireless channel time delay extension $d_c = 64$, FFT window deviation value $d_d = 100001$, and the combined prefix position $d = d_d - N_{cp} + d_c = 99553$, then a combined signal $z(n)$ may be expressed as $z(n) = x(100001 + n), n = 0, 1, \ldots, 3647;$ $z(n) = [x(100001 + n) + x(95905 + n)]/2, n = 3648, \ldots, 4095;$ Step S5: A FFT calculation module processes FFT calculation for the combined signal value to obtain a frequency domain data subcarrier signal;

the FFT calculation module transforms signal $z(n)$ from time domain to frequency domain and completes analysis of a spectrum characteristics of the signal. For example, the FFT at point 4096 is calculated for the combined $z(n)$, to obtain frequency domain data subcarrier signal $Y(n) = FFT(z(n))$.

Step S6: A channel estimation module calculates a frequency domain original channel estimation value and compensates phases for the original channel estimation values of OFDM symbols according to the channel estimation compensation indication value resulting from calculation of the FFT window control module, then processes filtering for the compensated result on time domain and/or frequency domain;

the step S6 above specifically comprises the following steps:

firstly, estimating an original channel;

the pilot of a synchronous symbol or OFDM symbol is used. Under LS criterion or MMSE criterion, a single-tap equalization method may also be directly used to is calculate frequency domain original channel estimation value.

secondly, processing filtering on time domain;

low-pass filtering on each subcarrier is processed for the original channel estimation value. Assuming that the filtering on time domain adopts FIR filtering structure of five OFDM symbols altogether. Phase modification to the original channel estimation values before an OFDM symbol center is, namely two OFDM symbols before current OFDM symbol, conducted based on the channel estimation compensation indication output by the FFT window control module. The corrected values of phases compensated on subcarrier k are all $\exp\{j2\pi k t_0/N\}$, wherein k represents the reference number of a subcarrier of the OFDM symbol, $t_0$ represents channel estimation compensation indication value, and $t_0 = d_{offset}$, N represents the number of subcarriers of the OFDM symbol. And then, processing interpolation filtering on frequency domain;

interpolation filtering is processed for the channel estimation value after filtering on time domain to obtain a final channel estimation value $\hat{H}(n)$ of current OFDM symbol. The step that processing interpolation filtering on frequency domain is optional.

S7: An equalization detection module receives the filtering result and, processes equalization and detection for the frequency domain data subcarrier signal resulting from calculation of the FFT calculation module according to the filtering result, so as to eliminate the influence of a wireless channel on received signals.

After processing equalization and detection for the frequency domain data subcarrier signal $Y(n)$ calculated by the FFT calculation module according to the final channel estimation $\hat{H}(n)$ of current OFDM symbol so as to eliminate the influence of the wireless channel on the received OFDM signals, an estimation $\hat{X}(n)$ of a symbol transmitted on each subcarrier of OFDM may be obtained, which is further transmitted to an error correcting coding module for follow-up processing.

When other conditions are the same, the adoption of the method provided by the is present invention may effectively lower a symbol error rate (SER) of $\hat{X}(n)$, improve the quality of $\hat{X}(n)$ and enhance the performance of the OFDM signal demodulation device. By making use of the structural characteristics of physical layer signals, the method estimates the time delay characteristic (i.e. channel time delay extension) of a wireless channel and timing offset value. Through adjusting a channel time delay extension and timing offset value of a received signal, it makes full use of the time domain signal of an OFDM symbol to protect information and promote the demodulation performance of the OFDM signal demodulation device, as well as greatly lowers the sensitivity of the OFDM signal demodulation device to timing offset with very low realization complexity.

Figure 2:
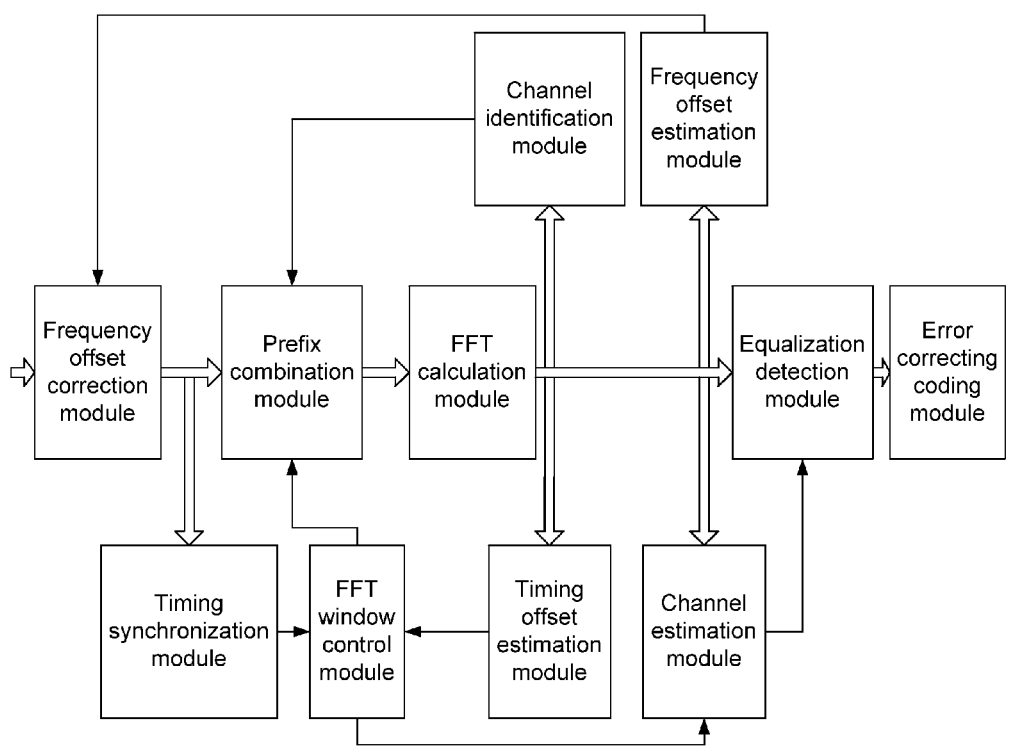
FIG. 2 is a schematic of the modules of an OFDM signal demodulation device provided by the present invention.
Figure 3:
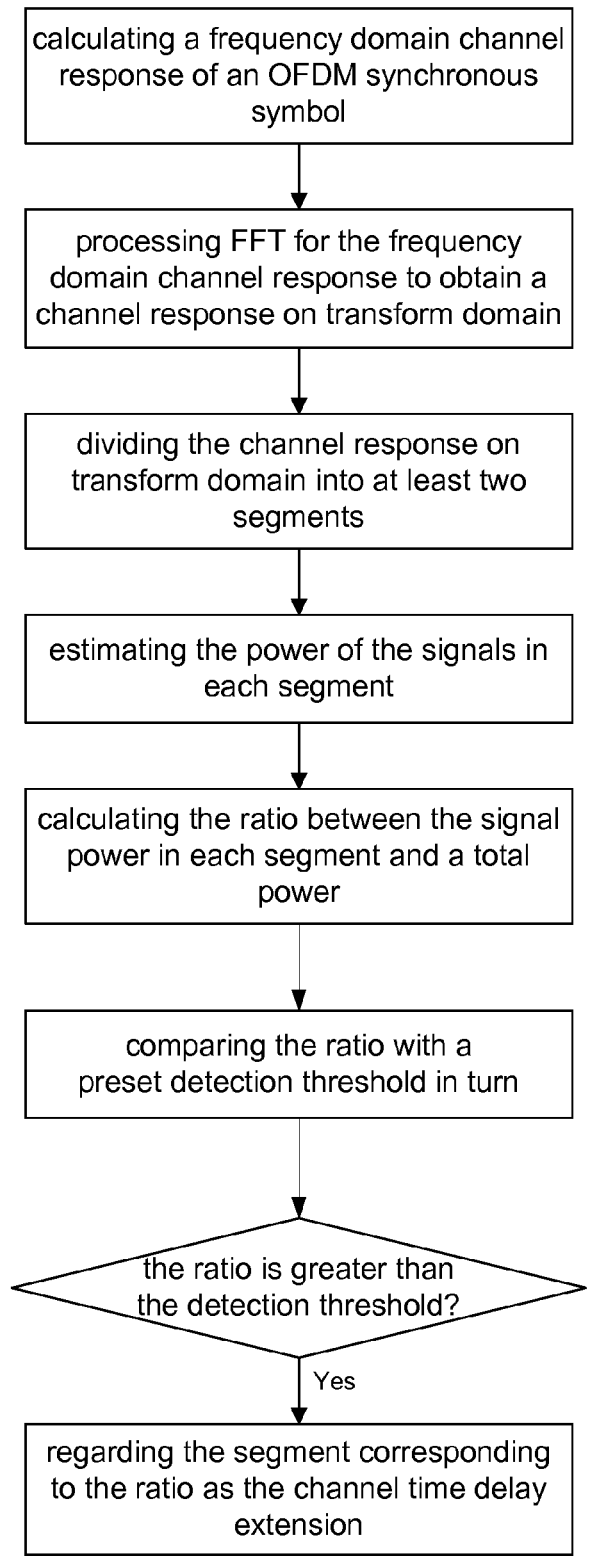
FIG. 3 shows a flow chart of a method for calculating a channel time delay extension.

Please refer to FIG. 2, which is a schematic of the modules of an OFDM signal demodulation device provided by the present invention.

The OFDM signal demodulation device provided by the present invention comprises: a frequency offset estimation module, a frequency offset correction module, a channel identification module, a timing offset estimation module, a timing synchronization module, an FFT window control module, a prefix combination module, an FFT calculation module, a channel estimation module, an equalization detection module and an error correcting coding module.

The frequency offset estimation module is used for estimating the frequency offset of a received signal.

The frequency offset correction module is used for receiving the frequency offset resulting from the estimation of the frequency offset estimation module, and eliminating the frequency offset of a received signal through phase rotation.

The channel identification module is used for calculating channel time delay extension. Specifically, the channel identification module calculates a frequency domain channel response of an OFDM synchronous symbol, then processes FFT for the frequency domain channel response to obtain channel response on transform domain, divides a channel response on transform domain into at least two segments, is estimates the power of signals in each segment, then calculates the ratio between the signal power in each segment and a total power, compares the ratios with a preset detection threshold in turn, and regards the segment corresponding to the ratio as the channel time delay extension when a ratio is greater than the detection threshold.

The timing offset estimation module is used for calculating the timing offset of the OFDM signal demodulation device.

The timing synchronization module is used for searching the initial position of the time slot of an OFDM signal.

The FFT window control module is used for calculating window deviation value and channel estimation compensation indication value. Specifically, the FFT window control module compares the initial position of an OFDM symbol with an addition result of a timing offset estimation value of the OFDM signal demodulation device, and outputs the offset of an integer sampling point as the channel estimation compensation indication value if timing offset of an integer sampling point occurs. Further, the initial position of the OFDM symbol is added to the timing offset estimation value to obtain the window deviation value of the OFDM symbol.

The prefix combination module is used for adding the channel time delay extension resulting from calculation of the channel identification module to the window deviation value resulting from calculation of the FFT window control module to obtain a combined prefix initial position, and calculating a combined signal value starting from the prefix initial position.

The FFT calculation module is used for processing FFT calculation for the signal value after combination by the prefix combination module to obtain a frequency domain data subcarrier signal.

The channel estimation module is used for calculating a frequency domain original channel estimation value, processing channel estimation on the basis of the original channel estimation value phase modification of the OFDM symbol according to the channel estimation compensation indication value resulting from calculation of the FFT window control module, i.e. processing phase modification to the original channel estimation value of the OFDM symbol, and processing filtering for a corrected result on time domain and/or frequency domain.

The equalization detection module is used for processing equalization and detection for the frequency domain data subcarrier signal based on the result of channel estimation. Specifically, the equalization detection module receives the filtering result and processes equalization and detection for the frequency domain data subcarrier signal resulting from calculation of the FFT calculation module according to the filtering result, so as to eliminate the influence of a wireless channel on received signals.

The error correcting coding module is used for processing error correcting and coding for signals transmitted by the equalization detection module.

Compared with the prior art, by adopting the OFDM signal demodulation method and the device thereof provided by the present invention, timing offset may be estimated and adjusted in real time during the use of a low-accuracy crystal oscillator, sampling offset correction can be realized in low complexity, and may make full use of the useful information in OFDM frames so as to maximally improve the performance of the OFDM signal demodulation device.

The foregoing descriptions are preferred embodiments of the present invention and are not intended to limit the present invention. For those skilled in the art, the present invention may have various changes and modifications. All modifications, identical replacements and improvements made without departing from the spirit and principle of the present invention shall be within the protection scope of the present invention.

What is claimed is:

1. An OFDM signal demodulation method, comprising the following steps:

adding a pre-obtained timing offset estimation value of an OFDM signal demodulation device to the initial position of an OFDM symbol of a received signal to obtain a window deviation value of the OFDM symbol;

adding a channel time delay extension to the window deviation value to obtain a combined prefix initial position, calculating a combined OFDM signal value starting from the prefix initial position, and processing a Fast Fourier Transform (FFT) for the combined OFDM signal value to obtain a frequency domain data subcarrier signal;

calculating a frequency domain original channel estimation value, processing channel estimation based on the original channel estimation value phase modification of the OFDM symbol according to a channel estimation compensation indication value, and processing equalization and detection for the frequency domain data subcarrier signal according to the channel estimation result, wherein calculating a frequency domain channel response of an OFDM synchronous symbol, and processing FFT for the frequency domain channel response to obtain a channel response on transform domain; dividing the channel response on transform domain into at least two segments and estimating the power of the signals in each segment, and then calculating the ratio between the signal power in each segment and a total power; comparing the ratios with a preset detection threshold in turn, and regarding the segment corresponding to the ratio as the channel time delay extension when a ratio is greater than the detection threshold.

2. The method according to claim 1, wherein the method further comprising:

comparing the initial position of an OFDM symbol with an addition result of the timing offset estimation value, and outputting an offset of the integer sampling point as the channel estimation compensation indication value if timing offset of an integer sampling point occurs.

3. The method according to claim 1, wherein the method further comprising:

obtaining, through calculation, the timing offset estimation value of the OFDM signal demodulation device according to the phase change relations among different subcarriers of OFDM signal received by the OFDM signal demodulation device.

4. The method according to claim 1, wherein the corrected value of the phase modification is $\exp\{j2\pi k t_0/N\}$, wherein k represents the reference number of a subcarrier of an OFDM symbol, $t_0$ represents channel estimation compensation indication value, and N represents the number of a subcarriers of the OFDM symbol.

5. An OFDM signal demodulation device, comprising an FFT window control module, a prefix combination module, an FFT calculation module, a channel estimation module, an equalization detection module and a channel identification module, wherein,
- the FFT window control module is used for adding a timing offset estimation value of an OFDM signal demodulation device to an initial position of an OFDM symbol to obtain a window deviation value of the OFDM symbol;
- the prefix combination module is used for adding a channel time delay extension to the window deviation value to obtain a combined prefix initial position, and calculating a combined OFDM signal value starting from the prefix initial position;
- the FFT calculation module is used for processing FFT for the combined OFDM signal value to obtain a frequency domain data subcarrier signal;
- the channel estimation module is used for calculating a frequency domain original channel estimation value, and processing channel estimation based on the original channel estimation value phase modification of the OFDM symbol according to a channel estimation compensation indication value;
- the equalization detection module is used for processing equalization and detection for the frequency domain data subcarrier signal according to the channel estimation result;
- the channel identification module is used for calculating a frequency domain channel response of an OFDM synchronous symbol, and processing FFT for the frequency domain channel response to obtain a channel response on transform domain; dividing the channel response on transform domain into at least two segments and estimating the power of the signals in each segment, and then calculating the ratio between the signal power in each segment and a total power; comparing the ratios with a preset detection threshold in turn, and regarding the segment corresponding to the ratio as the channel time delay extension when a ratio is greater than the detection threshold.

6. The device according to claim 5, wherein the FFT window control module is further used for comparing the initial position of an OFDM symbol with an addition result of the timing offset estimation value, and outputting an offset of the integer sampling point as the channel estimation compensation indication value when timing offset of an integer sampling point occurs.

7. The device according to claim 5, wherein the device further comprising a timing synchronization module, which is used for searching the initial position of the time slot of an OFDM signal so that the FFT window control module may determine the initial position of current OFDM symbol.

8. The device according to claim 5, wherein the device further comprising a timing offset estimation module, which is used for calculating the timing offset estimation value of an OFDM signal demodulation device.

9. The method according to claim 2, wherein the corrected value of the phase modification is $\exp\{j2\pi kt_0/N\}$, wherein k represents the reference number of a subcarrier of an OFDM symbol, $t_0$ represents channel estimation compensation indication value, and N represents the number of a subcarriers of the OFDM symbol.

10. The method according to claim 3, wherein the corrected value of the phase modification is $\exp\{j2\pi kt_0/N\}$, wherein k represents the reference number of a subcarrier of an OFDM symbol, $t_0$ represents channel estimation compensation indication value, and N represents the number of a subcarriers of the OFDM symbol.

11. The device according to claim 6, wherein the device further comprising a timing synchronization module, which is used for searching the initial position of the time slot of an OFDM signal so that the FFT window control module may determine the initial position of current OFDM symbol.

12. The device according to claim 6, wherein the device further comprising a timing offset estimation module, which is used for calculating the timing offset estimation value of an OFDM signal demodulation device.

\* \* \* \* \*